United States Patent
Tantawi et al.

(10) Patent No.: US 8,224,465 B2
(45) Date of Patent: *Jul. 17, 2012

(54) COORDINATING SERVICE PERFORMANCE AND APPLICATION PLACEMENT MANAGEMENT

(75) Inventors: Asser N. Tantawi, Somers, NY (US); Giovanni Pacifici, New York, NY (US); Michael Spreitzer, Croton-On-Hudson, NY (US); Malgorzata Steinder, Fort Lee, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/776,469

(22) Filed: May 10, 2010

(65) Prior Publication Data

US 2010/0223379 A1     Sep. 2, 2010

Related U.S. Application Data

(63) Continuation of application No. 12/117,521, filed on May 8, 2008, now Pat. No. 7,720,551, which is a continuation of application No. 10/952,394, filed on Sep. 28, 2004, now abandoned.

(51) Int. Cl.
*G06F 19/00* (2011.01)
(52) U.S. Cl. .................. 700/1; 700/3; 709/200
(58) Field of Classification Search .......... 700/108–111, 700/1–3; 709/250, 200, 224, 223, 226, 203; 705/7–10, 400; 370/390, 432, 256
See application file for complete search history.

(56) References Cited

U.S. PATENT DOCUMENTS

| | | | |
|---|---|---|---|
| 6,778,531 B1 * | 8/2004 | Kodialam et al. | 370/390 |
| 6,907,304 B1 * | 6/2005 | Hintz et al. | 700/99 |
| 7,134,001 B1 * | 11/2006 | Coon et al. | 712/204 |
| 2002/0133328 A1 * | 9/2002 | Bowman-Amuah | 703/22 |
| 2002/0174227 A1 * | 11/2002 | Hartsell et al. | 709/226 |

(Continued)

FOREIGN PATENT DOCUMENTS

EP     1426861 A     6/2004

(Continued)

OTHER PUBLICATIONS

E.N. Herness, et al., "WebSphere Application Server: A foundation for on demand computing," IBM Systems Journal, vol. 43, No. 2, 2004.

(Continued)

*Primary Examiner* — Kidest Bahta
(74) *Attorney, Agent, or Firm* — Michael J. Buchenhorner; Yazken Alexanian

(57) ABSTRACT

Coordinating tasks of performance management and application placement management in a dynamic fashion by: estimating capacity needs for various service classes of service requests; computing desired capacities of at least one application for said service requests; deciding whether the desired capacities are satisfied by a current application placement; making no change to current application placement if the desired capacities are satisfied; determining a new application placement based on the desired capacities and a projected load if the desired capacities are not satisfied; computing corresponding capacity constraints for all pairs of service classes and servers; and computing an optimal allocation of capacities among the service classes so as to optimize a quality of service.

2 Claims, 5 Drawing Sheets

U.S. PATENT DOCUMENTS

| | | | |
|---|---|---|---|
| 2003/0055967 A1* | 3/2003 | Worley | 709/226 |
| 2003/0236745 A1* | 12/2003 | Hartsell et al. | 705/40 |
| 2004/0117794 A1 | 6/2004 | Kundu | |
| 2004/0243650 A1* | 12/2004 | McCrory et al. | 707/203 |
| 2005/0005200 A1* | 1/2005 | Matena et al. | 714/38 |

FOREIGN PATENT DOCUMENTS

| | | | |
|---|---|---|---|
| JP | 2001067377 A | 3/2001 | |
| JP | 2002318791 A | 10/2002 | |
| JP | WO2004081789 A | 9/2004 | |
| JP | 20065200027 A | 8/2006 | |

OTHER PUBLICATIONS

Heiki Ludwig, et al., "A Service Level Agreement Language for Dynamic Electronic Services," Proceedings of the 4th IEEE Intl' Workshop on Advanced Issues of E-Commerce and Web-Based Information Systems (WECWIS 2002).

William Leinberger, et al., "Multi-Capacity Bin Packing Algorithms with Applications to Job Scheduling under Multiple Constraints," May 27, 1999.

\* cited by examiner

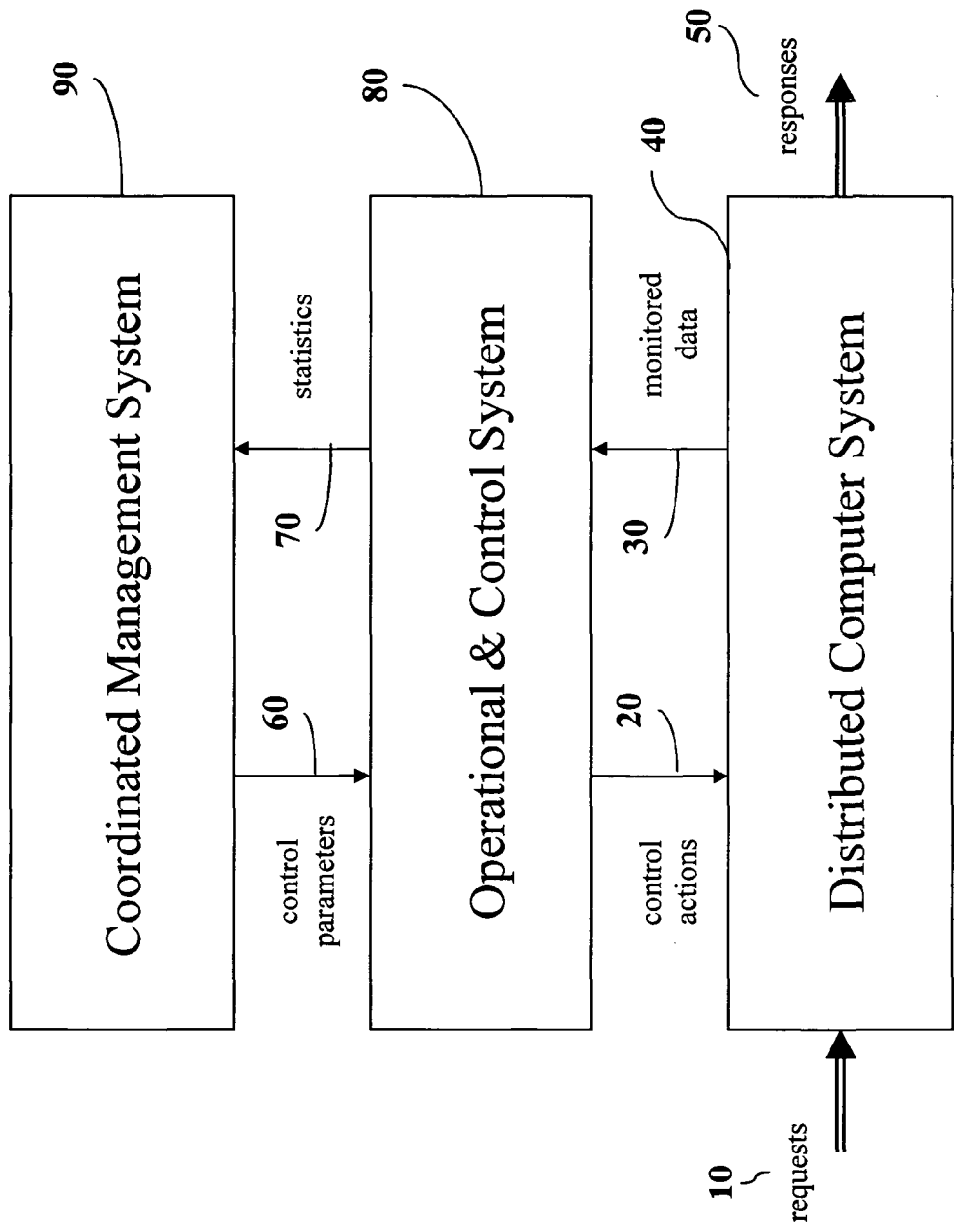
Figure 1. System Overview

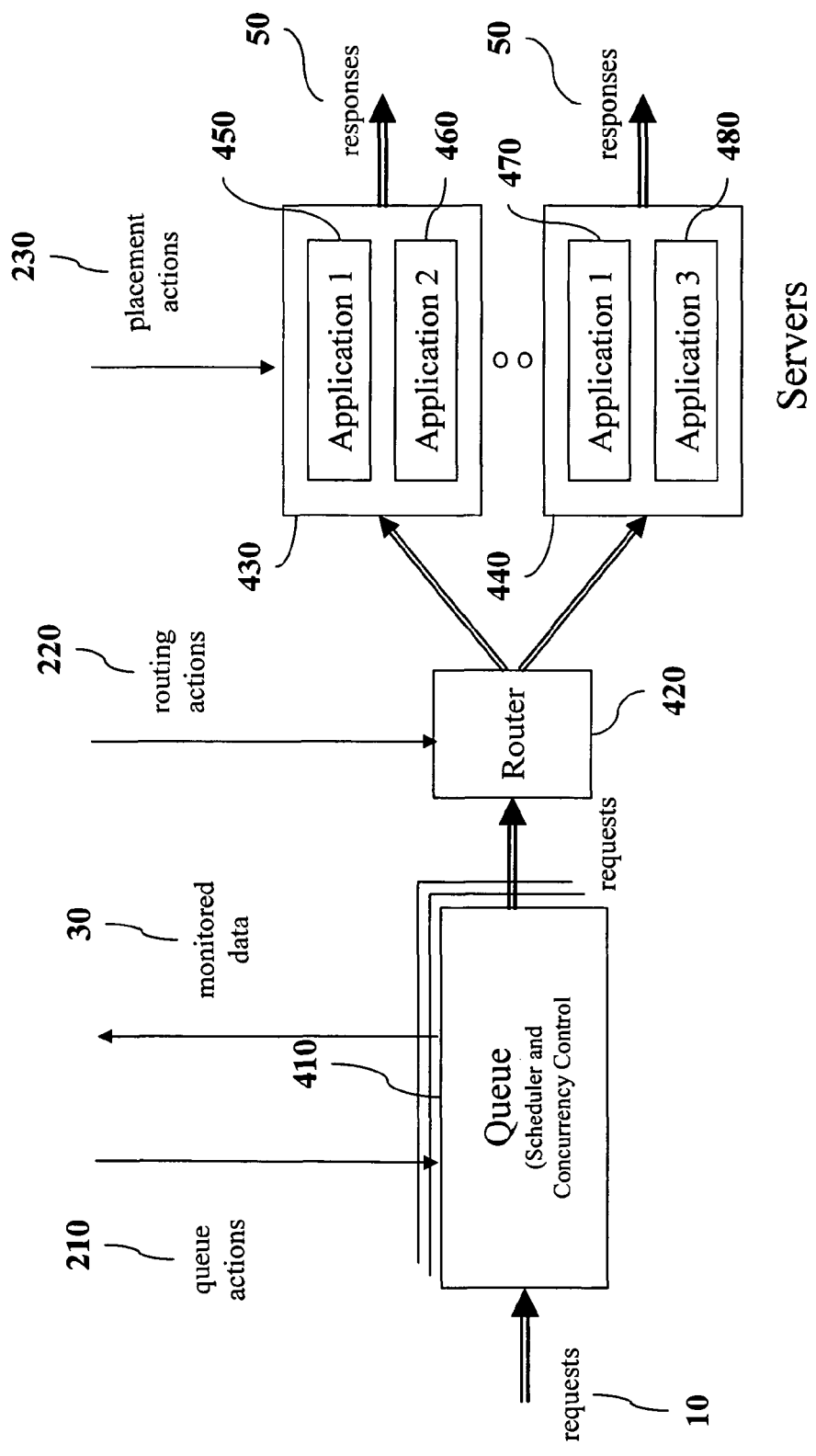
Figure 2. Distributed Computer System

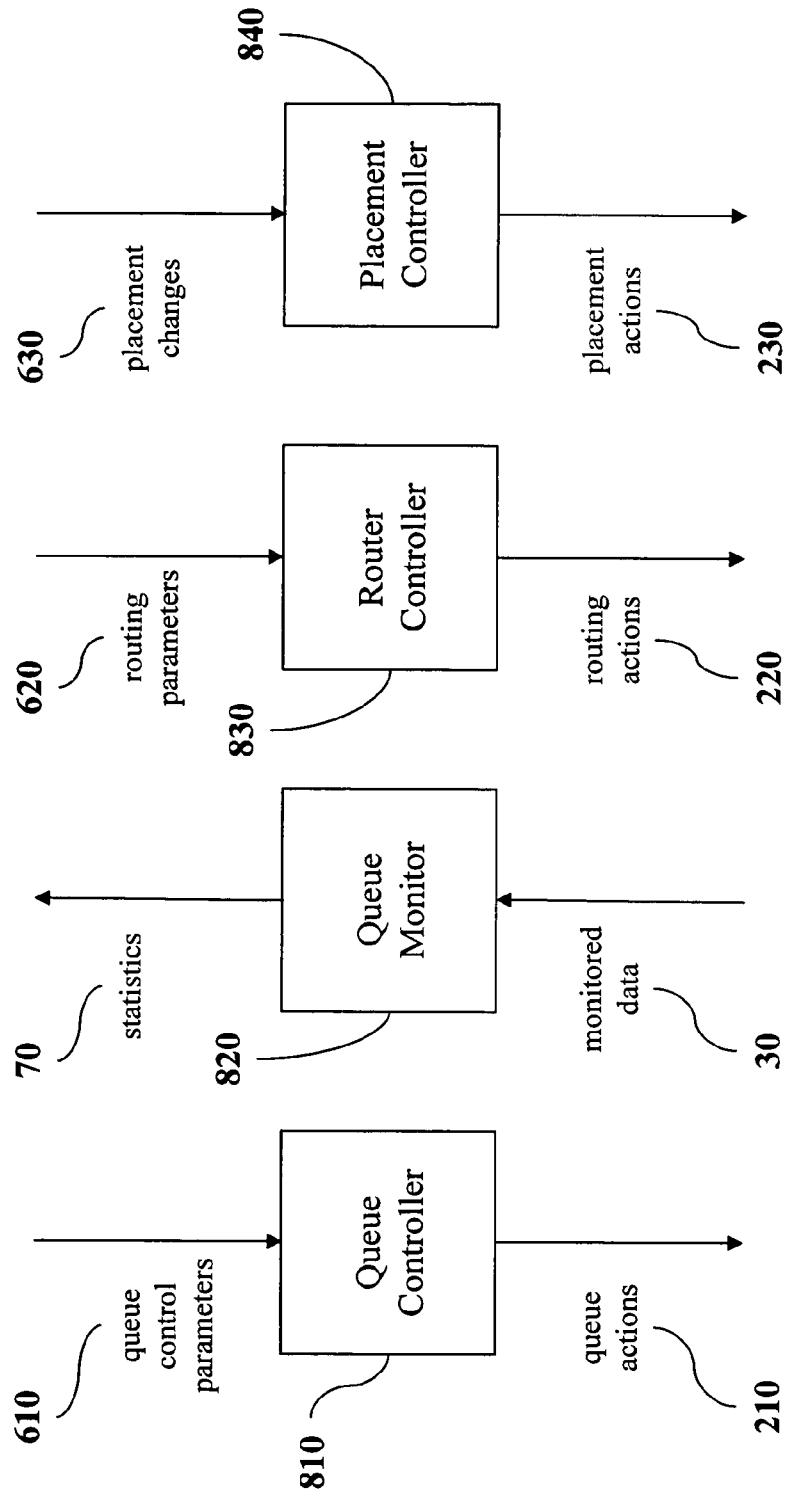
Figure 3. Operational & Control System

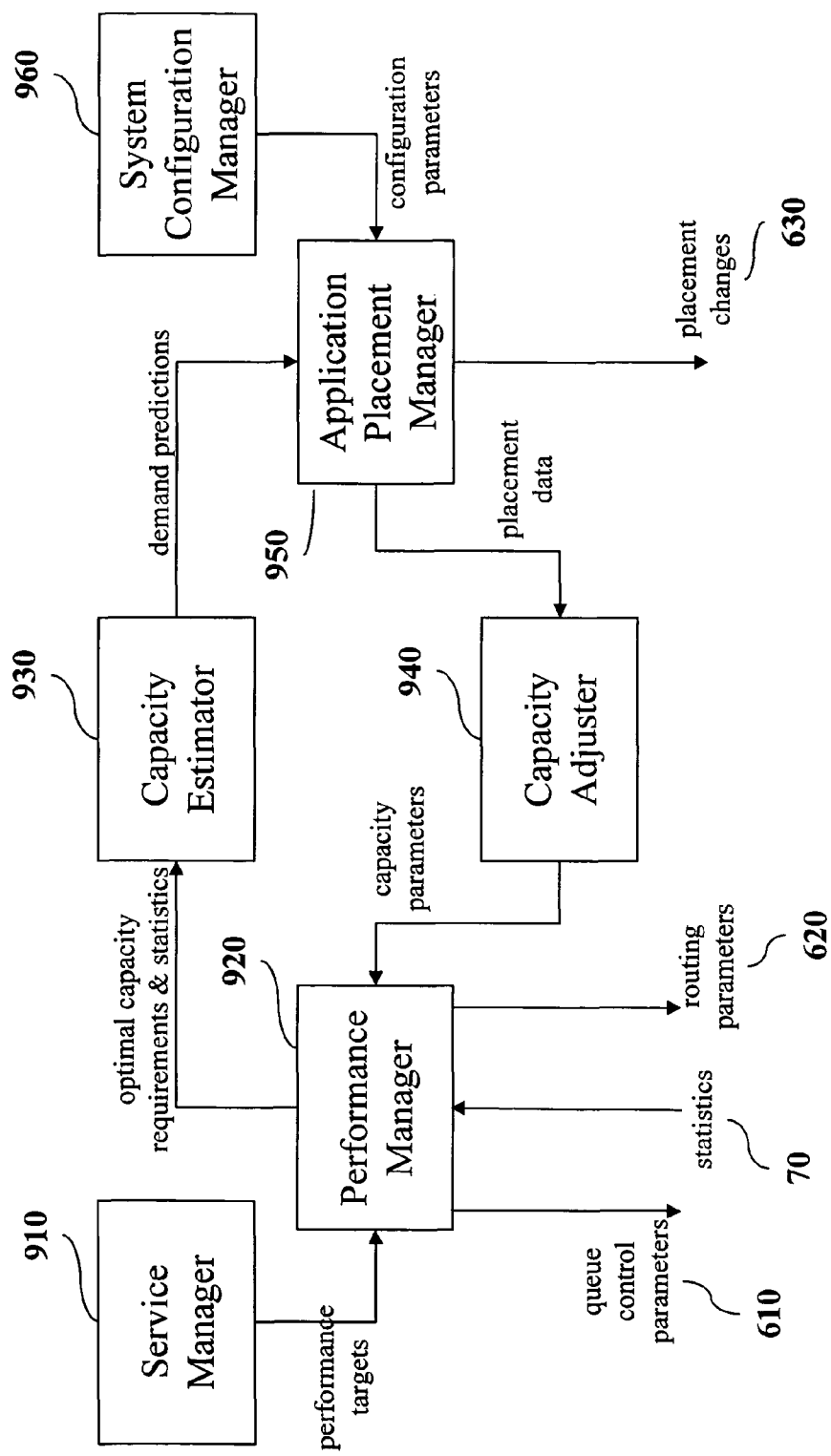
Figure 4. Coordinated Management System

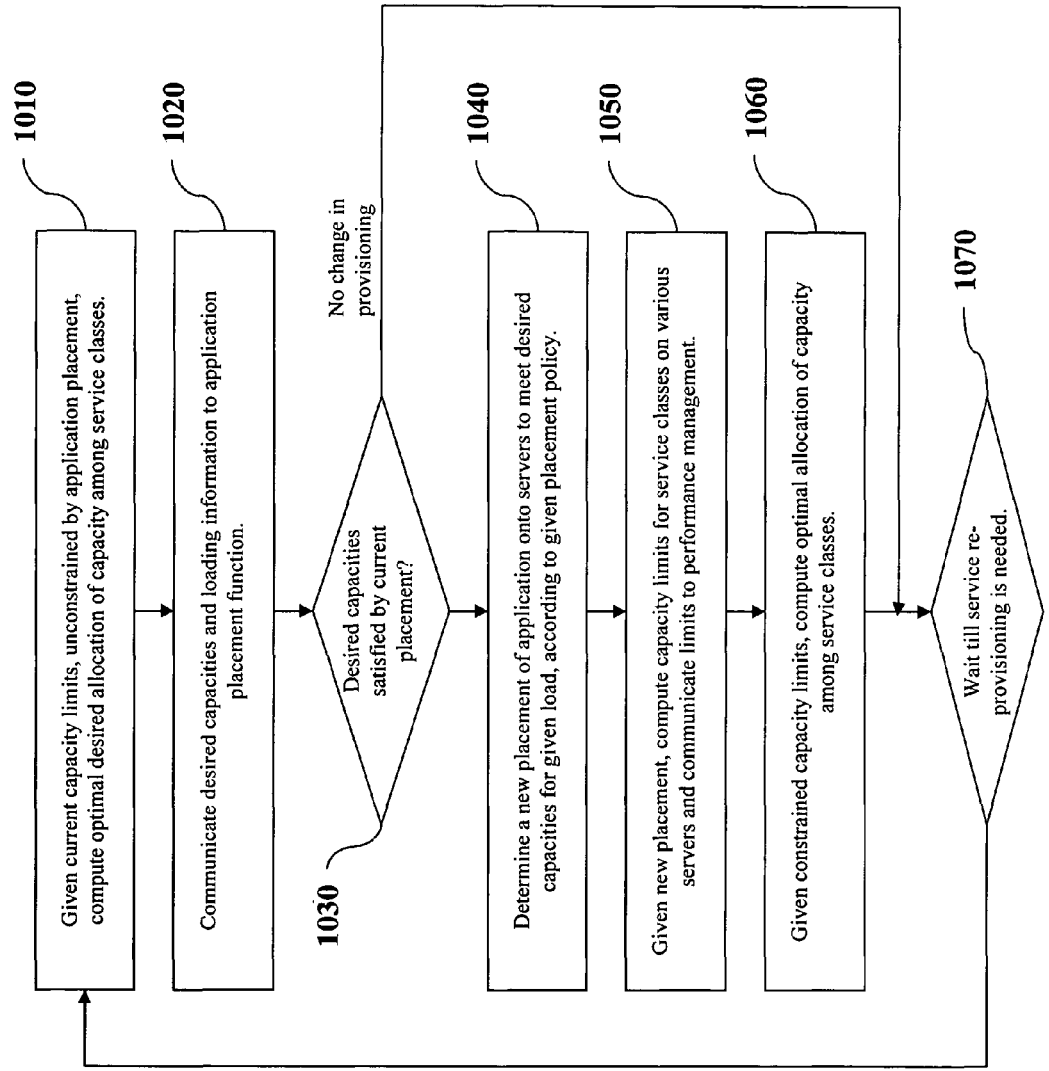
Figure 5. Coordinated Management Flow

COORDINATING SERVICE PERFORMANCE AND APPLICATION PLACEMENT MANAGEMENT

CROSS-REFERENCE TO RELATED APPLICATIONS

This application is a continuation of, and claims priority from, U.S. patent application Ser. No. 12/117,521, filed on May 8, 2008, which is a continuation of U.S. patent application Ser. No. 10/952,394, filed on Sep. 28, 2004; which applications are incorporated in their entirety as if fully set forth herein.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention relates to on-demand provisioning of services in a computer system so as to best meet the quality of service level provided in the face of fluctuations in the service request load. More particularly, the invention relates to the coordination of the tasks of a performance manager and an application placement manager, to better estimate capacity needs of the various services and the adjustment of the placement of applications providing the services onto servers in the computer system.

BACKGROUND OF THE INVENTION

A computer system, which consists of one or more servers, where requests belong to a multitude of quality-of-service classes, each with a guaranteed performance quality of service, and the request load fluctuates with time is considered. In such a system, a performance manager works dynamically towards achieving the performance guarantees for the various quality-of-classes of requests by optimally allocating resources and properly directing schedulers, concurrency controllers, and routers. Similarly, an application placement manager works dynamically towards optimally placing multiple instances of applications, providing the services, onto servers. If the performance manager and the application placement manager are not working in synchrony, then either each manager will attempt to achieve its local goals without addressing the global objectives, or both managers may work against each other in a way that improving the performance of one manager may place severe restrictions on the other manager. Therefore, there is a need for coordination between the efforts of the performance manager and the application placement manager.

The prior art suggests that the performance manager and the application placement manager perform their tasks in two separate management domains. A system administrator sets some management configuration parameters manually, without a dynamic, automatic process for coordinating meeting the performance guarantees and placing applications onto servers.

SUMMARY OF THE INVENTION

To overcome these problems, an aspect of this invention is to provide apparatus, systems and methods for dynamic coordination between the performance manager and the application placement manager in a distributed computer system.

Another aspect of this invention is to provide systems and methods for a process for communicating demand estimation and resource allocation information from the performance manager to the application placement manager in a distributed computer system.

Still another aspect of this invention is to provide systems and methods for a process for communicating capacity loading constraints information from the application placement manager to the performance manager in a distributed computer system.

A further aspect of this invention is to provide systems and methods for dynamic coordination between the performance manager and the application placement manager in a distributed computer system.

This invention introduces a process for coordinating the tasks of the performance manager and the application placement manager in a dynamic fashion. Further, this invention introduces a system that implements the coordination process. The process is dynamic in the face of fluctuations in the request load to the distributed computer system and the periodic adjustments to the placement of applications onto servers in the distributed computer system. There are two opposite functional flows in the process: a demand estimation function and a capacity adjustment function. The coordination system involves two subsystems: a demand estimator and a capacity adjuster, along with appropriate interfaces to of the performance manager and the application placement manager. There are several advantages to dynamic coordination between the performance manager and the application placement manager. First, the application placement process reacts quicker to demand fluctuations. Second, the performance guarantees are better met by rearranging the resources to be allocated to the various classes of service. Third, the management system works in an unsupervised mode, thus reducing manual administration costs and human errors.

BRIEF DESCRIPTION OF THE SEVERAL VIEWS OF THE DRAWINGS

These and other aspects, features, and advantages of the present invention will become apparent upon further consideration of the following detailed description of the invention when read in conjunction with the drawing figures, in which:

FIG. 1 is a block diagram of the system overview according to an example embodiment of the present invention;

FIG. 2 illustrates a distributed computer system according to an example embodiment of the present invention;

FIG. 3 illustrates an operational and control system according to an example embodiment of the present invention;

FIG. 4 illustrates an coordinated management system according to an example embodiment of the present invention;

FIG. 5 shows flow diagram of the coordination process according to an example embodiment of the present invention;

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

The present invention provides apparatus, systems and methods for coordinating the tasks of an performance manager and an application placement manager. The process is dynamic in the face of fluctuations in the service request load to the computer system and the periodic adjustments to the placement of applications onto servers in the computer system. There are two opposite functional flows in the process: a capacity estimation function and a capacity adjustment function. The coordination system involves two subsystems: a capacity estimator and a capacity adjuster, along with appropriate interfaces to of the performance manager and the application placement manager. There are several advantages to the dynamic coordination between the performance manager and the application placement manager. First, the application placement process reacts quicker to demand fluctuations. Second, the performance guarantees are better met by rearranging the resources to be allocated to the various classes of service. Third, the management system works in an unsupervised mode, thus reducing manual administration costs and human errors.

As used herein a service includes satisfaction of a client request by providing connectivity, connection elements, application invocation and resources required to perform the actions responsive to the request. In order to be a satisfactory service, a service should have means for subscription, means for specifying and committing to a guaranteed quality of service, ensuring provision of the quality of service including resource allocation for complete responsiveness. Applications include static and dynamic access to web content, enterprise applications, and access to database servers. More specifically, applications may be provided by HTTP web servers, servlets, Enterprise Java Beans (EJB), database queries in a Websphere environment. A particular service may be composed of any combination of simple or complex of one or more services.

When the service requests for a particular application increases, the on-demand provisioning system deploys additional instances of the application in order to accommodate the increased load. An instance of an application is deployed in a run-time environment specific to the application. For example, a web page retrieval needs a web server, a servlet needs a web container, an EJB application needs an EJB container, and a database application needs a database server. The various run-time environments are provided on one or more computer systems, forming a distributed computer system.

A service provider and/or business offers to customers services which are satisfied by executing one or more applications. When a customer subscribes to a service, he selects one of potentially many service classes, each defined by a quality-of-service guarantee. For example, a quality-of-service guarantee may be a target value for the average response time of a service request, or a target fraction of service requests with response times above a specified threshold value. A service contract between the service provider and the customer usually states actions to be taken when the quality-of-service guarantee is, or is not, met. Such actions may be of financial nature and/or legal nature. The goal of the service provider is to meet as much as possible the quality-of-service guarantees for all quality-of-service classes and all services provided. To achieve that goal, it is imperative to have an on-demand management environment where (1) resources are dynamically allocated to service requests belonging to a multitude of quality-of-service classes and (2) instances of applications are dynamically deployed and un-deployed.

The first step involves a service performance manager which, given a set of instances of applications placed on computer systems, allocates capacities of the various resources, such as storage, computing power, threads of execution, and connections to application servers and database servers, to the service requests belonging to the various quality-of-service classes. This step incorporates the performance modeling of the various resources and the optimization of resource allocation.

The second step involves an application placement manager which, given capacity needs for the various applications as well as their capacity requirements and available capacity in the computer system, decides on the number of instances of each application that need be deployed. This step further incorporates the solution of a capacity-constrained placement optimization problem as well as the steps of deploying and un-deploying of application instances. The latter may be performed in a manual, supervised, or fully automatic mode.

The overall goal is to best meet the quality-of-service guarantees for all quality-of-service classes and all services provided. To achieve that end, a coordination between performance management and application placement management is sought. The process of coordination involves several steps: (1) computing a desired capacity to achieve the quality-of-service guarantees; (2) employing the desired capacity in determining a placement of applications onto servers; (3) computing capacity limits of services and applications based on the placement; and (4) determining an allocation of capacity to satisfy the quality-of-service guarantees, subject to the placement and capacity limit. This process repeats periodically and/or based on a criterion, for example when the monitored performance is degraded or when some quality-of-service guarantees are not met.

In some embodiments, the step of computing a desired capacity includes optimizing achievement of the quality of service while disregarding any application placement constraints.

In some embodiments, the step of employing includes determining if desired capacities are satisfied by a current application placement If satisfied, the current placement is used as a solution to the application placement. If not satisfied, the desired capacity is used as an input into a method for solving an application placement problem.

In some embodiments, the step of computing a capacity limit includes examining a placement matrix and capacity of servers within the computer system, and/or the step of determining an allocation of capacity includes solving an optimization problem to achieve the quality of service, the optimization problem is constrained by an application placement matrix.

In some embodiments the method includes: monitoring performance of the computer system in meeting the quality of service guarantee, when the quality of service guarantee is not being met, repeating the steps of: computing a desired capacity; employing; computing a capacity limit; and the step of determining until the quality of service guarantee is met. Sometimes the step of monitoring is performed based on a monitoring criterion, and/or the step of monitoring is performed based on a monitoring criterion.

In some embodiments the method includes: the at least one application satisfies a plurality of service requests for a plurality of services, and repeating the steps of: computing a desired capacity; employing; computing a capacity limit; and determining, until the quality of service guarantee is met for all service requests and all services.

In some embodiments the method includes: at least one application satisfying a plurality of service requests for a plurality of services, repeating the steps of: computing a desired capacity; employing; computing a capacity limit; and the step of determining, until the quality of service guarantee is met for all service requests and all services.

The first step involves the monitoring of performance metrics for all quality-of-service classes. The performance metrics include, but not limited to, the traffic intensity of service requests, the response time of service requests, the resource usage of applications satisfying service requests. A performance model is then constructed using such performance metrics as model parameters. The model is analyzed to provide values for the quality-of-service measure as a function of the allocated capacity to the various quality-of-service classes. The model is used to compute the desired capacity to achieve the quality-of-service guarantees. Given the model and unconstrained by the number of application instances and their placement on servers, an optimization problem is solved to best distribute the overall capacity among the quality-of-service classes. In other words, the first step is a solution to a measurement-based, model-driven, unconstrained resource allocation problem. The solution obtained may or may not be realizable given the capacity constraints of the applications.

The second step uses the desired capacities derived in step 1 to determine the best placement of application onto servers, in order to best realize the availability of the desired capacities. In case the current application placement realizes the desired capacities, the placement remains the same. Otherwise, a new application placement is sought. Each application instance requires a given amount of resources, such as storage requirement and computing cycles. Such resources are provided by servers with limited capacities. Due to the multitude of applications and services, the application placement step involves the solution of a multiple-class knapsack bin packing problem. For practical considerations, the optimization problem is solved using heuristic techniques. The output of the optimization problem is an application placement matrix, where rows represent applications, columns represent servers, and a 1 (or 0) entry in a cell represents the placement (or lack of) of a particular application onto a particular server. The placement matrix is realized by deploying (and un-deploying) application instances in the current application placement. An objective in the optimization problem is the minimization of overhead for carrying out the realization of the placement matrix.

The third step is about computing capacity limits induced by the new application placement. By examining the application matrix and measuring available server capacities, capacity limits for subsets of applications are obtained. Each application satisfies one or more quality-of-service classes. Thus, the capacity limits are computed for subsets of quality-of-service classes. The computed capacities are constrained, as opposed to desired capacities computed in step 1, by the application placement matrix.

The fourth step uses the capacity limits computed in step three as constraints in solving a constrained resource allocation problem. The objective of such a problem is to best meet the quality-of-service guarantees for the various quality-of-service classes. The optimization criterion could be the maximization of an overall utility function of the quality-of-service measures and their target, or the balancing of resources among the quality-of-service classes in order to relatively meet the quality-of-service guarantees.

A high level layered diagram of the on-demand service provisioning and performance management in a computer system is described in FIG. 1. There are three layers: a distributed computer system 40, an operational and control system 80, and a coordinated management system 90. Requests 10 belonging to various classes of service are submitted to the distributed computer system 40, where they are processed and appropriate responses 50 are generated. An operational and control system 80 monitors the performance of requests 10 as they are processed as well as the usage of resources in the distributed computer system 40. The monitored data 30 is collected through monitors in the distributed computer system 40 and is communicated to the operational and control system 80. In addition, the operational and control system 80 generates control actions 20 that are directed to actuators in the distributed computer system 40. The top layer consists of a coordinated management system 90 which receives statistics information 70 from the operational and control system 80 and reacts by sending control parameters 60 to the operational and control system 80.

FIG. 2 describes the distributed computer system 40. Requests 10 belonging to various classes of service arrive at a scheduler, which puts requests in a multitude of queues 410 based on the service class, and a concurrency controller, which limits the number of requests of each class that is being serviced in the system. Once dispatched, a request is routed through a router 420 to a specific server where it receives its service through the execution of an application that is already placed on that server, and then a response 50 is generated. FIG. 2 depicts two servers: 430 and 440, and three applications: Application1, Application2, and Application3. There are two instances of Application 1: 450 and 470, running on servers 430 and 440, respectively. Whereas, there is only one instance of Application2 460 running on server 430, and only one instance of Application3 480 running on server 440. Queue 410 collects monitored data 30 and send it to the operational and control system 80. In return, the operational and control system 80 sends queue actions 210 to control the queue 410, routing actions 220 to control the router 420, and placement actions 230 to control the placement of application instances on servers.

FIG. 3 describes the operational and control system 80. A queue controller 810 controls the scheduler and the concurrency controller, and it receives its queue control parameters 610 from the coordinated management system 90. Also, the monitored data 30 is collected a queue monitor 820 which provides statistics 70 to the coordinated management system 90. Also, routing weights 220 are provided to a router controller 830 by the coordinated management system 90. A placement controller 840 affects the placement changes 630 directives that it receives from the coordinated management system 90 and perform the corresponding placement actions 230.

FIG. 4 describes the coordinated management system 90. The performance manager 920 optimizes the performance of the system, while attempting to meet performance targets provided by the service manager 910. The application placement manager 950 generates an optimal placement of application instances onto servers, using the configuration parameters provided by the system configuration manager 960. The coordination between the performance manager 920 and the application placement manager 950 is performed through a capacity estimator 930 and a capacity adjuster 940. The capacity estimator 930 uses the optimal capacity requirements (unconstrained by the placement) and the statistics data to predict the load on the applications. The obtained predictions as well as the configuration information are used by the application placement manager 950 to produce placement changes 630. This new placement data is then used by the capacity adjuster 940 to calculate a new set of capacity limits that are constrained by the new placement.

We note that there is no need to iterate though the coordination process since both the performance manager 920 and the application placement manager 950 employ their own models and optimization problems, as opposed to a black box control approach.

A flow diagram of the coordination process is illustrated in FIG. 5. The process repeats based on decision 1070, which may be periodic, with a given control period or activated when the performance of the system starts to deteriorate. The first step 1010 in the process involves the estimation of capacity needs for the various service classes. Unconstrained by the current application placement, a capacity estimator computes the optimal allocation of the overall capacities among the various service classes so as to optimize the quality of service. In step 1020, the computed desired capacities are communicated along with other loading information to the application placement manager. A decision 1030 is made of whether the desired capacities are satisfied by the current application placement. If so, no change is necessary. Otherwise, a new application placement is determined 1040 based on the desired capacities and the projected load. The algorithm for determining an application placement may use a given placement policy. The new application placement is communicated to a Capacity Adjuster which computes 1050 the corresponding capacity constraints for all pairs of service classes and servers. Such capacity limits are then provided to the Performance Manager as input. In turn, the Performance Manager computes 1060 an optimal allocation of capacities among the service classes so as to optimize the quality of service.

Thus, the present invention includes a method for coordinating performance management and application placement management. The method includes the steps of: estimating capacity needs for various service classes of service requests; computing desired capacities of at least one application for the service requests; deciding whether the desired capacities are satisfied by the current application placement, making no change to current application placement if the desired capacities are satisfied; determining a new application placement based on the desired capacities and a projected load if the desired capacities are not satisfied; computing corresponding capacity constraints for all pairs of service classes and servers; and computing an optimal allocation of capacities among the service classes so as to optimize the quality of service.

In some embodiments the method includes: repeating the steps of estimating; computing desired capacities; deciding, computing corresponding capacity constraints; and computing an optimal allocation, based on a repetition criterion.

The present invention also includes a method for provisioning at least one application to satisfy a quality service level for at least one service. The method including the step of coordinating a service performance manager and an application placement manager in a computer system, the service performance manager managing performance of the at least one service, and the application placement manager managing placement of at least one application, the application satisfying a service request for a particular service. The step of coordinating includes the steps of: computing a desired capacity to achieve the quality of service level defined for the particular service; the application placement manager employing the desired capacity in determining a placement of the at least one application onto at least one server in the computer system in accordance with a placement policy; computing a capacity limit of the particular service to the at least one application based on the placement; and the performance manager determining an allocation of capacity to satisfy the quality of service level subject to the placement and capacity limit.

In some embodiments the method includes: communicating the desired capacity to the application placement manager; and communicating the placement and the capacity limit to the service performance manager. In some embodiments: the step of communicating the desired capacity comprises representing the desired capacity as a desired capacity vector, wherein an element in the desired capacity vector corresponds to the quality of service level; and/or the step of communicating the placement and the capacity limit comprises representing the placement as a placement matrix, wherein rows or columns of the placement matrix correspond to the applications and columns or rows of the placement matrix correspond to the servers, and representing the capacity limit as a capacity limit vector wherein an element in the capacity limit vector correspond to the server.

The present invention also includes an apparatus to provision at least one application to satisfy at least one quality of service guarantee. Said at least one application satisfying a plurality of service requests for a particular service. The apparatus includes: means for computing a desired capacity to achieve the quality of service level defined for the particular service; means for employing the desired capacity in determining a placement of said at least one application onto at least one server in a computer system in accordance with a placement policy; means for computing a capacity limit of the particular service to said at least one application based on the placement; and means for determining an allocation of capacity to satisfy the quality of service level subject to the placement and capacity limit.

The present invention also includes an apparatus to coordinate performance management and application placement management. The apparatus includes: means for estimating capacity needs for various service classes of service requests; means for computing desired capacities of at least one application for the service requests; means for deciding whether the desired capacities are satisfied by the current application placement; means for making no change to current application placement if the desired capacities are satisfied; means for determining a new application placement based on the desired capacities and a projected load if the desired capacities are not satisfied; means for computing corresponding capacity constraints for all pairs of service classes and servers; and means for computing an optimal allocation of capacities among the service classes so as to optimize the quality of service.

The present invention also includes an apparatus to provision at least one application to satisfy a quality service level for at least one service. The apparatus includes: means for coordinating a service performance manager and an application placement manager in a computer system, the service performance manager includes means for managing performance of said at least one service, and the application placement manager includes means for managing placement of at least one application, the application satisfying a service request for a particular service.

The means for coordinating includes: means for computing a desired capacity to achieve the quality of service level defined for the particular service, the application placement manager includes means for employing the desired capacity in determining a placement of said at least one application onto at least one server in the computer system in accordance with a placement policy; means for computing a capacity limit of the particular service to said at least one application based on the placement; and the performance manager includes means for determining an allocation of capacity to satisfy the quality of service level subject to the placement and capacity limit.

The entirety or a portion of the methods, systems and apparatus employing concepts of this invention may be implemented as being provided by a service provider. The entirety or portions of these may be used in a business and/or as a basis of forming a business.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product such as a computer-readable storage medium, which comprises all the features enabling the implementation of the methods described herein, and which—when loaded in a computer system —is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is noted that the foregoing has outlined some of the more pertinent aspects and embodiments of the present invention. This invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. An apparatus within a distributed computing environment, said apparatus comprising:
   a processor device performing:
   coordinating tasks of a performance manager and an application placement manager, to estimate capacity needs of various services of said particular service and adjusting placement of said applications providing said services onto servers in the distributed computer system;
   computing a desired capacity to achieve said quality of service level defined for said particular service using configuration parameters provided by a system configuration manager;
   employing said desired capacity in determining a placement of said plurality of applications onto at least one server in said computer system in accordance with a placement policy;
   computing a capacity limit of said particular service to said plurality of applications based on said placement; and
   determining an allocation of capacity to satisfy said quality of service level subject to said placement and capacity limit;
   wherein said step of computing a desired capacity includes optimizing achievement of the quality of service while disregarding any application placement constraints;
   wherein said function of employing comprises using a capacity estimator for determining when desired capacities are satisfied by a current application placement, when satisfied using the current application placement as a solution to an application placement problem;
   when not satisfied, using the desired capacity as an input into a method for solving the application placement problem; and
   wherein said function of computing a capacity limit includes examining an application placement matrix and capacity of servers within said computer system;
   wherein said function of determining an allocation of capacity includes solving an optimization problem to achieve the quality of service, said optimization problem is constrained by the application placement matrix, and said plurality of applications satisfying a plurality of service requests for said various services; and
   further comprising:
   monitoring performance of the computer system in meeting the quality of service guarantee, when the quality of service guarantee is not being met; and
   the step of monitoring is performed based on a monitoring criterion, and repeating the steps of:
   computing a desired capacity;
   employing; computing a capacity limit; and
   determining a capacity adjuster until the quality of service guarantee is met for all service requests and said various services, and providing said on-demand provisioning of the plurality of applications satisfying said quality of service guarantee for said applications.

2. A non-transitory computer readable storage medium having computer readable program code stored therein, said computer readable program code comprising instructions that, when executed by a processor device, cause a computer to perform:
   coordinating tasks of a performance manager and an application placement manager, to estimate capacity needs of various services of said particular service and adjusting placement of said applications providing said services onto servers in the distributed computer system;
   computing a desired capacity to achieve said quality of service level defined for said particular service using configuration parameters provided by a system configuration manager;
   employing said desired capacity in determining a placement of said plurality of applications onto at least one server in said computer system in accordance with a placement policy;
   computing a capacity limit of said particular service to said plurality of applications based on said placement; and
   determining an allocation of capacity to satisfy said quality of service level subject to said placement and capacity limit;
   wherein said step of computing a desired capacity includes optimizing achievement of the quality of service while disregarding any application placement constraints;
   wherein said function of employing comprises using a capacity estimator for determining if desired capacities are satisfied by a current application placement, if satisfied using the current application placement as a solution to an application placement problem;
   if not satisfied using the desired capacity as an input into a method for solving the application placement problem; and
   wherein said function of computing a capacity limit includes examining an application placement matrix and capacity of servers within said computer system;

wherein said function of determining an allocation of capacity includes solving an optimization problem to achieve the quality of service, said optimization problem is constrained by the application placement matrix, and said plurality of applications satisfying a plurality of service requests for said various services; and further comprising:

monitoring performance of the computer system in meeting the quality of service guarantee, when the quality of service guarantee is not being met; and the step of monitoring is performed based on a monitoring criterion, and repeating the steps of:

computing a desired capacity;

employing; computing a capacity limit; and determining a capacity adjuster until the quality of service guarantee is met for all service requests and said various services, and providing said on-demand provisioning of the plurality of applications satisfying said quality of service guarantee for said applications.

* * * * *